United States Patent
Okahashi et al.

(10) Patent No.: US 12,092,910 B2
(45) Date of Patent: Sep. 17, 2024

(54) OPTICAL MODULATOR

(71) Applicant: SUMITOMO OSAKA CEMENT CO., LTD., Tokyo (JP)

(72) Inventors: Kosuke Okahashi, Tokyo (JP); Norikazu Miyazaki, Tokyo (JP); Masayuki Motoya, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 297 days.

(21) Appl. No.: 17/593,924

(22) PCT Filed: Aug. 14, 2019

(86) PCT No.: PCT/JP2019/031908
§ 371 (c)(1),
(2) Date: Sep. 28, 2021

(87) PCT Pub. No.: WO2020/194782
PCT Pub. Date: Oct. 1, 2020

(65) Prior Publication Data
US 2022/0179247 A1    Jun. 9, 2022

(30) Foreign Application Priority Data
Mar. 28, 2019   (JP) ................................ 2019-064447

(51) Int. Cl.
*G02B 6/12*     (2006.01)
*G02F 1/035*    (2006.01)
(Continued)

(52) U.S. Cl.
CPC .............. *G02F 1/035* (2013.01); *G02F 1/212* (2021.01); *G02F 1/225* (2013.01); *G02B 2006/12142* (2013.01); *G02F 2202/20* (2013.01)

(58) Field of Classification Search
CPC ........................................... G02B 2006/12142
See application file for complete search history.

(56) References Cited

U.S. PATENT DOCUMENTS

| | | | |
|---|---|---|---|
| 6,545,791 B1 * | 4/2003 | McCaughan | G02F 1/2255 359/321 |
| 9,664,931 B1 | 5/2017 | Yap et al. | |

(Continued)

FOREIGN PATENT DOCUMENTS

| | | | |
|---|---|---|---|
| JP | 06235891 A | 8/1994 | |
| JP | 09297289 A | 11/1997 | |

(Continued)

OTHER PUBLICATIONS

JP-2014066940-A English translation (Year: 2014).*
ISR issued in PCT/JP2019/031908 mailed Oct. 8, 2019.

*Primary Examiner* — Charlie Y Peng
(74) *Attorney, Agent, or Firm* — Greer Burns & Crain Ltd.

(57) ABSTRACT

In order to provide an optical modulator capable of preventing damage to the substrate and preventing deterioration of the properties of the modulator by reducing the stress on the substrate generated by the modulation electrode, there is provided an optical modulator 1, including: a substrate 5 having an electro-optic effect; an optical waveguide 10 formed on the substrate 5; and a modulation electrode (signal electrode S and ground electrode G) provided on the substrate 5 and modulating a light wave propagating in the optical waveguide 10, wherein a resin 8 to reduce the stress on the substrate 5 generated by the modulation electrode is arranged between a part of the bottom surface of the modulation electrode and the substrate 5 facing a part of the bottom surface of the modulation electrode.

13 Claims, 13 Drawing Sheets

(51) Int. Cl.
*G02F 1/21* (2006.01)
*G02F 1/225* (2006.01)

(56) References Cited

U.S. PATENT DOCUMENTS

| | | | |
|---|---|---|---|
| 11,333,909 B2 * | 5/2022 | Okahashi | G02F 1/035 |
| 2002/0030245 A1 * | 3/2002 | Hanaoka | H01L 24/13 |
| | | | 257/E21.597 |
| 2008/0031564 A1 * | 2/2008 | Sugiyama | G02F 1/0356 |
| | | | 385/9 |
| 2017/0299811 A1 | 10/2017 | Wessels et al. | |

FOREIGN PATENT DOCUMENTS

| | | | | |
|---|---|---|---|---|
| JP | 10274758 | A | | 10/1998 |
| JP | 2006243376 | A | * | 9/2006 |
| JP | 2010181454 | A | | 8/2010 |
| JP | 2010256761 | A | | 11/2010 |
| JP | 2014066940 | A | * | 4/2014 |
| JP | 2014071383 | A | | 4/2014 |
| JP | 2017054033 | A | | 3/2017 |
| JP | 2017129834 | A | | 7/2017 |

\* cited by examiner

OPTICAL MODULATOR

FIELD OF THE INVENTION

The present invention relates to an optical modulator including a substrate having an electro-optic effect, an optical waveguide formed on the substrate, and a modulation electrode for modulating a light wave propagating in the optical waveguide.

BACKGROUND ART

In recent years, in the fields of optical communication and optical measurement, optical modulators that form an optical waveguide on a substrate such as lithium niobate ($LiNbO_3$: hereinafter referred to as LN) having an electro-optic effect and a modulation electrode made of metal that modulates the light wave propagating in the optical waveguide are used.

Patent Literature No. 1 below discloses an optical modulator having a gap provided between a part of the bottom surface of the ground electrode and a corresponding part of the substrate. Further, Patent Literature No. 2 below discloses an optical modulator having a ground electrode provided with a first electrode portion and a second electrode portion arranged inside the first electrode portion.

In addition, in order to realize a wide band of the optical modulation frequency, it is important to achieve speed matching between the microwave, which is a modulation signal, and the optical wave. For this reason, attempts have been made to reduce the drive power source while achieving speed matching between microwaves and light waves by thinning the substrate to reduce the thickness of the substrate.

CITATION LIST

Patent Literature (Patent Literature No. 1) Japanese Laid-open Patent Publication No. H6-235891
(Patent Literature No. 2) Japanese Laid-open Patent Publication No. 2010-181454

SUMMARY OF THE INVENTION

Technical Problem

For example, since the substrate is made of LN and the modulation electrode is made of metal, the linear expansion coefficient differs between the substrate and the modulation electrode. Therefore, due to the difference in linear expansion coefficient caused by the temperature change, internal stress is generated in the substrate in the vicinity of the contact with the modulation electrodes. In addition, compressive stress is generated on the substrate from the modulation electrodes arranged on the substrate, and this compressive stress cannot be ignored especially on a thin substrate. There is a problem that the substrate is damaged and the substrate is cracked or the like when the stress such as internal stress and compressive stress is generated on the substrate.

In addition, the substrate is made of a material having an electro-optic effect such as LN, and light modulation is performed by applying electricity to change the refractive index. However, there is such a problem that when the stress is generated on the substrate, the refractive index of the substrate changes due to a photoelastic effect, so that the propagation speed of the light wave changes. As a result, for example, there is such a problem that in an optical modulator having a Mach-Zehnder structure, a phase difference occurs at the time of a multiplexing in the Mach-Zehnder structure, and property deterioration such as a fluctuation of a bias voltage occurs.

As one of the methods for solving such a problem, for example, it can be considered to form a buffer layer to perform stress relief. However, there is such a problem that the buffer layer formed by a conventional sputtering film formation has a thin film thickness, and particularly when the thickness of the substrate is thin, the stress generated in the substrate cannot be sufficiently relieved. Further, it is generally the case that material having high rigidity such as $SiO_2$ (Young's modulus of $SiO_2$: 72 to 74 GPa) is used for the buffer layer. There is such a problem that in the buffer layer made of such a high rigidity material, the impact of the stress on the substrate by the modulation electrode is significant, and especially when the thickness of the substrate is thin, the stress generated on the substrate cannot be sufficiently relieved.

The optical modulators disclosed in Patent Literature No. 1 and Patent Literature No. 2 have effects of suppressing the occurrence of chirping, preventing a decrease in modulation efficiency, suppressing a driving voltage, and the like, but the effect of reducing the stress on the substrate by the modulation electrode is small. Therefore, the optical modulators disclosed in Patent Literature No. 1 and Patent Literature No. 2 cannot solve the above-mentioned problems addressed by the present invention.

In order to solve the above problems, the object of the present invention is to provide an optical modulator capable of preventing damage to the substrate and preventing deterioration of the properties of the modulator, by reducing the stress on the substrate generated by the modulation electrode.

Means to Solve the Problems

In order to solve the above problems, the optical modulator according to the present invention has the following technical features.

(1) In order to achieve the above object, an optical modulator according to the present invention comprises: a substrate having an electro-optic effect; an optical waveguide formed on the substrate; and a modulation electrode provided on the substrate and modulating a light wave propagating in the optical waveguide, wherein a resin is arranged between a part of a bottom surface of the modulation electrode and the substrate facing the part of the bottom surface of the modulation electrode.

According to this configuration, the stress on the substrate generated by the modulation electrode can be reduced by the resin arranged between the part of the bottom surface of the modulation electrode and the substrate facing the part of the bottom surface of the modulation electrode. The resin can secure a larger film thickness as compared with the buffer layer formed by the conventional sputtering film formation, so that it is possible to suppress the influence of the stress on the substrate by the modulation electrode. Further, the resin is a material having a lower rigidity (Young's modulus of the resin: about 1 to 2 GPa) than the material such as $SiO_2$ used for the buffer layer described above, and serves as a cushioning material that relieves the stress caused by the difference in linear expansion coefficient, even though there is a difference in linear expansion coefficient between the modulation electrode and the substrate. As a result, the arrangement of the resin makes it possible to prevent damage to the substrate and prevent deterioration of the properties of the modulator.

(2) In the optical modulator according to (1) above, the modulation electrode includes a signal electrode and a ground electrode arranged along a part of the optical waveguide, and the resin is arranged between a part of a bottom surface of at least one of the signal electrode and the ground electrode and the substrate facing the part of the bottom surface of at least one of the signal electrode and the ground electrode.

According to this configuration, it is possible to reduce the stress on the substrate generated by at least one of the signal substrate or the ground substrate, by the resin arranged between the part of the bottom surface of at least one of the signal electrode and the ground electrode and the substrate facing the part of the bottom surface of at least one of the signal electrode and the ground electrode, so that damage to the substrate can be prevented, and deterioration of the properties of the modulator can be prevented.

(3) In the optical modulator according to (2) above, when the resin is arranged between the signal electrode and the substrate, the width of the resin is set to ⅓ or less of the width of the signal electrode, and when the resin is arranged between the ground electrode and the substrate, the width of the resin is set to ½ or less of the width of the ground electrode.

According to this configuration, by setting the ratio of the width of the resin to the width of the modulation electrode as described above, it is possible to effectively apply an electric field to the optical waveguide and suppress peeling of the modulation electrode from the substrate.

(4) In the optical modulator according to any one of (1) to (3) above, the resin is arranged in the modulation electrode.

According to this configuration, a resin is formed on a normal substrate, and thereafter by forming the electrode so that the resin is embedded therein, it is possible to easily and surely arrange the resin between a part of the bottom surface of the modulation electrode and the substrate facing the part of the bottom surface of the modulation electrode.

(5) In the optical modulator according to any one of (1) to (4) above, the resin is arranged so that a symmetrical electric field is applied to a pair of optical waveguides to be modulated.

According to this configuration, it is possible to apply a symmetrical electric field to a pair of optical waveguides in, for example, a Mach-Zehnder-type waveguide, so that the non-uniformity of modulation efficiency that may occur due to the asymmetry of the electric field, the occurrence of chirping caused by the asymmetry of the modulation efficiency, and the like can be suppressed.

(6) In the optical modulator according to any one of (1) to (5) above, the resin is arranged so that a contact surface between the bottom surface of the modulation electrode and the substrate is arranged on a proximal side of the optical waveguide.

According to this configuration, it is possible to efficiently concentrate the electric field on the optical waveguide, so that it is possible to improve the modulation efficiency of the light wave in the optical waveguide.

(7) In the optical modulator according to any one of (1) to (6) above, thickness of the resin is 1.0 μm or more.

According to this configuration, a resin having a thickness capable of reliably reducing the stress on the substrate generated by the modulation electrode is arranged between a part of the bottom surface of the modulation electrode and the substrate facing the part of the bottom surface of the modulation electrode, so that it is possible to more reliably prevent damage to the substrate and more reliably prevent deterioration of the properties of the modulator.

(8) In the optical modulator according to any one of (1) to (7) above, the resin is either a thermoplastic resin or a thermosetting resin.

According to this configuration, it is possible to reduce the stress on the substrate generated by the modulation electrode, by using a photoresist made of either a thermoplastic resin or a thermosetting resin, thereby making it possible to prevent damage to the substrate and to prevent deterioration of the properties of the modulator. In particular, the resin can be formed on the substrate by a photolithography process, so that it is possible to precisely and easily control the pattern shape, thickness, and the like of the resin.

(9) In the optical modulator according to any one of (1) to (8) above, thickness of the substrate is 4.0 μm or less.

According to this configuration, even when the influence of the stress generated on the substrate due to the thinning of the substrate becomes significant, the stress on the substrate generated by the modulation electrode can be reduced by the resin arranged between a part of the bottom surface of the modulation electrode and the substrate facing the part of the bottom surface of the modulation electrode, so that it is possible to prevent damage to the substrate and to prevent deterioration of the properties of the modulator.

(10) In the optical modulator according to any one of (1) to (9) above, a rib portion projecting from the substrate is used as the optical waveguide.

According to this configuration, even when the influence of the stress generated on the substrate due to the rib-type waveguide becomes significant, the stress on the substrate generated by the modulation electrode can be reduced by the resin arranged between a part of the bottom surface of the modulation electrode and the substrate facing the part of the bottom surface of the modulation electrode, so that it is possible to prevent damage to the substrate and to prevent deterioration of the properties of the modulator.

(11) In the optical modulator according to any one of (1) to (10) above, the modulation electrode is made of metal and the substrate is made of lithium niobate.

According to this configuration, even when the stress is generated due to the difference in linear expansion coefficient between the substrate made of lithium niobate and the metal modulation electrode, the stress can be reduced, so that it is possible to prevent damage to the substrate and to prevent deterioration of the properties of the modulator.

(12) In the optical modulator according to any one of (1) to (11) above, the optical waveguide is constituted by a plurality of Mach-Zehnder portions.

According to this configuration, in a Mach-Zehnder-type optical modulator in which a plurality of Mach-Zehnder-type optical waveguides capable of generating optical signals corresponding to various modulation methods are integrated, by the resin arranged between a part of the bottom surface of the modulation electrode and the substrate facing the part of the bottom surface of the modulation electrode, the stress on the substrate generated by the modulation electrode can be reduced, so that it is possible to prevent damage to the substrate and to prevent deterioration of the properties of the modulator.

Effect of the Invention

According to the present invention, it is possible to prevent damage to the substrate and prevent deterioration of the properties of the modulator in the optical modulator, by reducing the stress on the substrate generated by the modulation electrode.

DETAILED DESCRIPTION OF THE INVENTION

Hereinafter, the optical modulator according to the embodiment of the present invention will be described.

Figure 1:
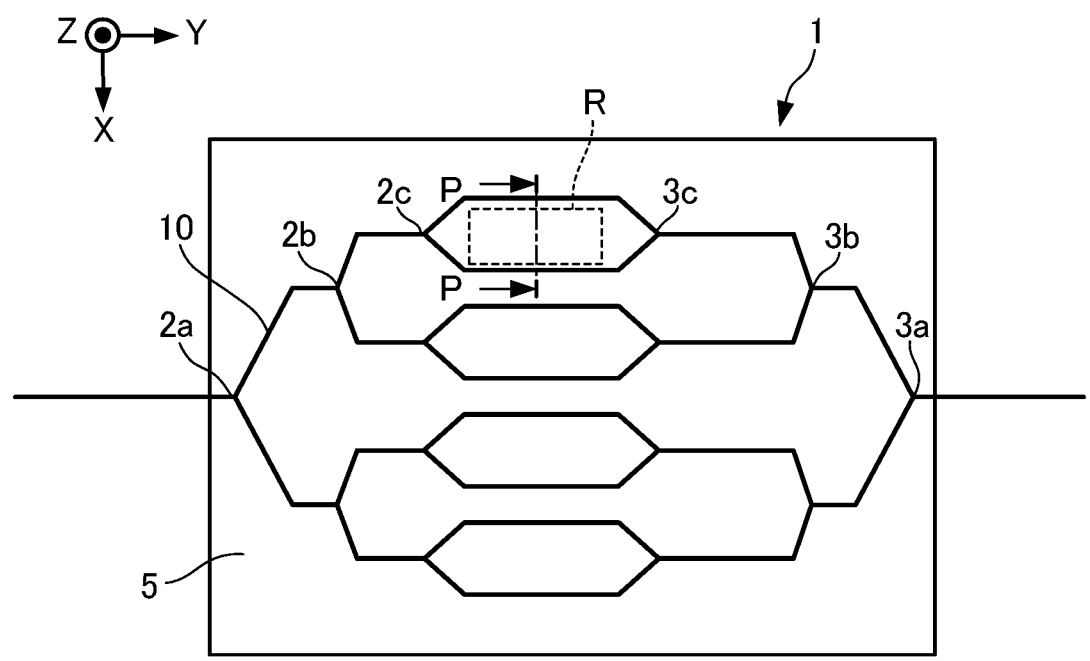
FIG. 1 is a plan view for explaining an example of an optical waveguide formed on a substrate constituting an optical modulator in the embodiment of the present invention.

FIG. 1 is a plan view for explaining an example of an optical waveguide formed on a substrate constituting an optical modulator in the embodiment of the present invention. In the drawings, the width direction of the optical modulator is defined as the X axis, the longitudinal direction of the optical modulator is defined as the Y axis, and the thickness direction of the optical modulator is defined as the Z axis.

The optical modulator 1 shown in FIG. 1 is an optical modulator 1 in which a plurality of Mach-Zehnder-type optical waveguides are integrated, and is also called a nested optical modulator. The optical modulator 1 in which a plurality of Mach-Zehnder type optical waveguides are integrated can generate optical signals corresponding to various modulation methods. As an example, FIG. 1 shows an optical modulator 1 in which a plurality of Mach-Zehnder-type optical waveguides are integrated, but the present invention is not limited to this structure, and the optical modulator 1 may, for example, have a single Mach-Zehnder-type optical waveguide.

As shown in FIG. 1, the optical modulator 1 according to the embodiment of the present invention includes an optical waveguide 10 formed on a substrate 5 made of a material having an electro-optic effect. The optical modulator 1 shown in FIG. 1 has a first branch portion 2a for branching an incoming waveguide into which an optical signal is introduced from the outside, and a second branch portion 2b for further branching an optical waveguide 10 branched by the first branch portion 2a, a third branch portion 2c that further branches the optical waveguide 10 branched by the second branch portion 2b, so that eight parallel waveguides in total are formed through three-step branching. The first to third branch portions 2a to 2c are realized by an optical coupler or the like. The phase of the light wave propagating in each parallel waveguide is adjusted by an electric field 11 applied to each parallel waveguide using, for example, a metal modulation electrode (not shown in FIG. 1) arranged in the vicinity of each parallel waveguide.

Further, the light wave propagating in each parallel waveguide is multiplexed at the first to third multiplexing portions 3a to 3c corresponding to each of the first to third branch portions 2a to 2c described above, and then outputted from an exit waveguide to the outside. To be specific, the optical modulator 1 shown in FIG. 1 is provided with a third multiplexing portion 3c that multiplexes a parallel waveguide branched at the third branch portion 2c, a second multiplexing portion 3b that multiplexes an optical waveguide 10 branched at the second branch portion 2b, and a first multiplexing portion 3a that multiplexes the optical waveguide 10 branched at the first branch portion 2a, and an optical signal is outputted from an outgoing waveguide through a three-step multiplication. Similar to the first to third branch portions 2a to 2c, the first to third multiplexing portions 3a to 3c are also realized by an optical coupler or the like.

Figure 2A:
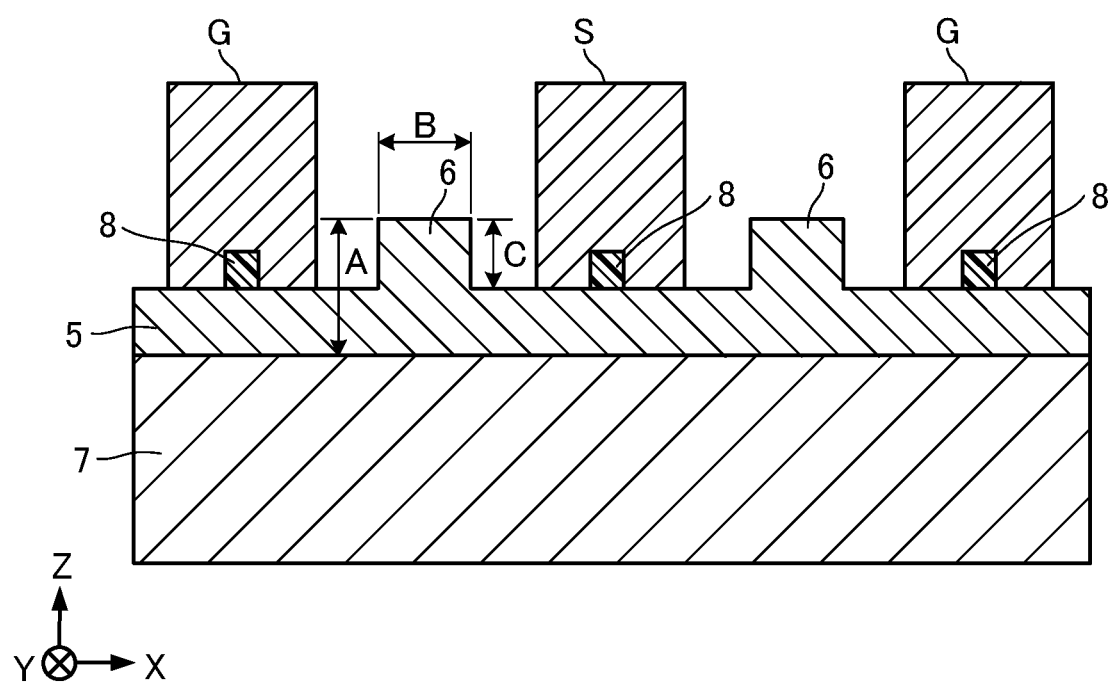
FIG. 2A is a diagram showing an example of a cross-sectional structure of an optical modulator according to an embodiment of the present invention, and is a cross-sectional view taken along the line P-P of FIG. 1.
Figure 3:
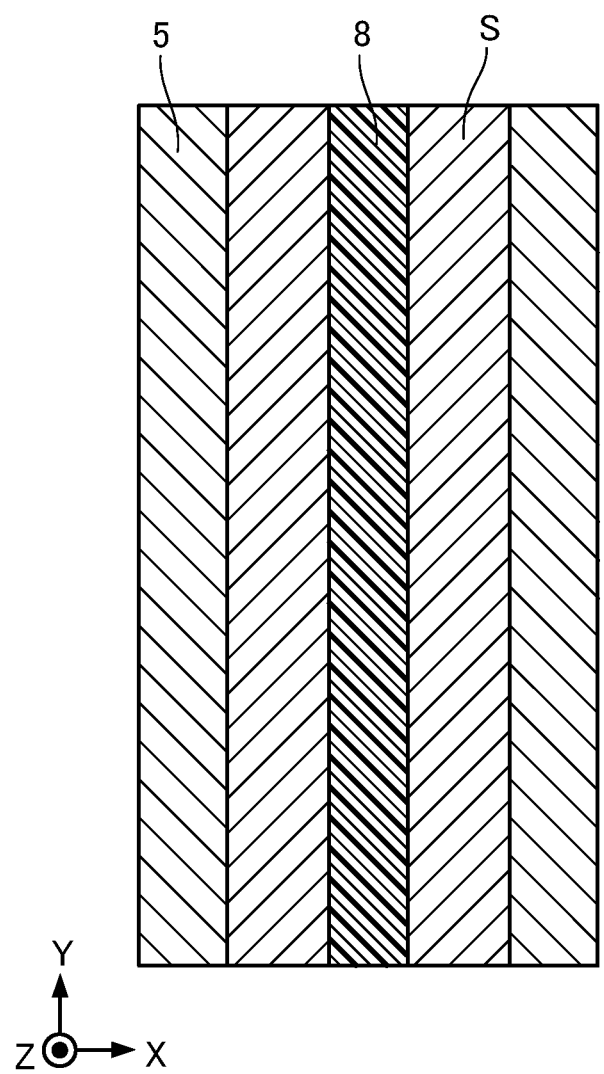
FIG. 3 is a plan view schematically showing an example of an optical modulator according to the embodiment of the present invention, and is a diagram schematically showing a resin arrangement pattern in the region R of FIG. 1.

FIG. 2A is a diagram showing an example of a cross-sectional structure of the optical modulator 1 according to the embodiment of the present invention, and is a cross-sectional view taken along the line P-P of FIG. 1. FIG. 3 is a plan view schematically showing an example of the optical modulator 1 according to the embodiment of the present invention, and is a diagram schematically showing an arrangement pattern of the resin 8 in the region R of FIG. 1.

As shown in the cross-sectional structure of FIG. 2A, the optical modulator 1 has a structure in which the substrate 5 is provided on a reinforcing substrate 7, and a modulation electrode is further provided on the substrate 5.

The substrate 5 is made of a material having an electro-optic effect. While the conventional substrate has a thickness of about 8 to 10 μm, the substrate 5 in the embodiment of the present invention can use, for example, an extremely thin plate having a thickness of about 1.0 to 2.0 μm. For the substrate 5, for example, LN can be used as a material having an electro-optic effect, but lithium tantalate (LiTaO₃), lead lanthanum zirconate titanate (PLZT), or the like may be used. As an example, FIG. 2A shows a cross-sectional structure of an optical modulator 1 which is an LN modulator using an X-cut substrate 5 on which an optical waveguide 10 is arranged between modulation electrodes in an action portion (modulation portion). However, the optical modulator 1 may be an LN modulator of an X-cut substrate 5 on which the optical waveguide 10 is arranged between the modulation electrodes in the action portion, or LN modulator of a Z-cut substrate 5 on which the optical waveguide 10 is arranged under the modulation electrode.

Figure 2B:
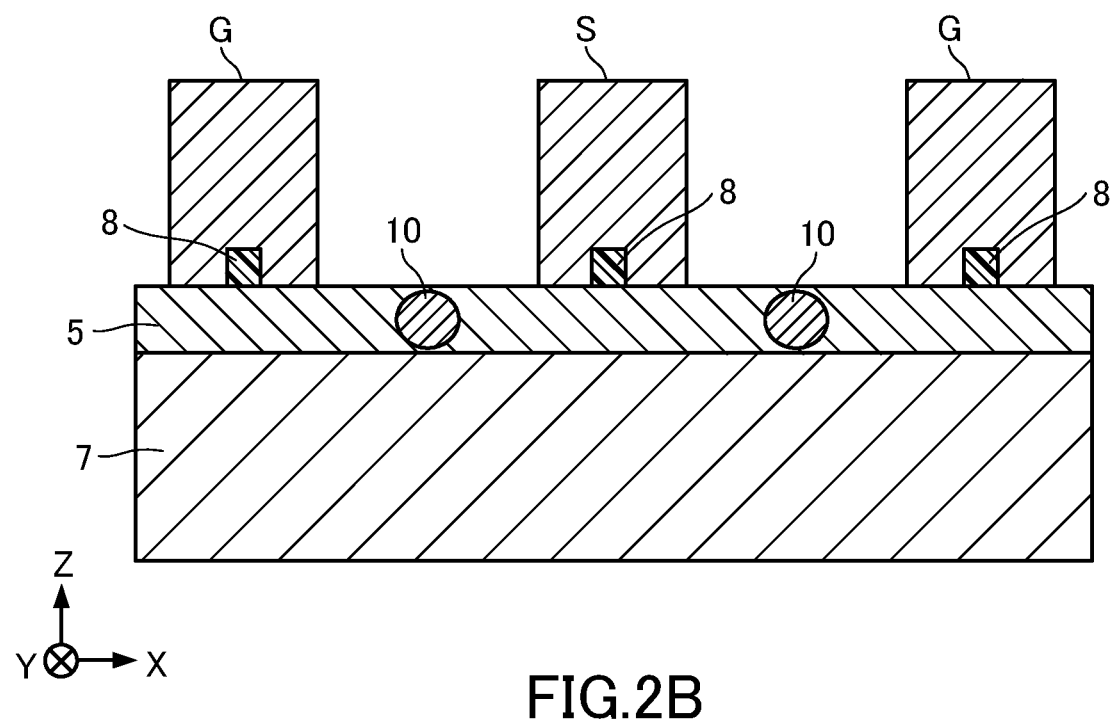
FIG. 2B is a diagram showing an example of a cross-sectional structure of an optical modulator according to an embodiment of the present invention, and is a diagram showing an example of a cross-sectional structure of another optical modulator in which an optical waveguide is formed in a substrate.

As shown in FIG. 2A, a rib portion 6 is provided on the substrate 5. The rib portion 6 projects from the surface of the substrate 5 and is used as the optical waveguide 10, since the rib portion 6 works to confine the light wave. As an example, FIG. 2A shows an optical modulator 1 having a rib-type substrate in which the rib portion 6 is formed on the substrate 5, but the structure is not limited to this structure, and for example, as shown in FIG. 2B, the optical modulator 1 may have an optical waveguide 10 formed in the substrate 5 by thermal diffusion of metal.

While the thickness of the conventional substrate 5 is 8.0 to 10.0 μm, the thickness of the rib-type substrate can be extremely thin, 1.0 to 2.0 μm, so that it is possible to achieve speed matching of the microwave and the light wave, and reduce the drive power supply. However, in such an extremely thin substrate 5, there is a problem that the influence of the compressive stress from the modulation electrodes arranged on the substrate 5 is large, so that the substrate 5 is damaged and cracks or the like occur. But, the present invention can address this problem.

In the optical modulator 1 according to the embodiment of the present invention, for example, the maximum value of the thickness A of the substrate 5 including the rib portion 6 is 4.0 μm, the maximum value of the width B of the rib portion 6 is 4.0 μm, and the maximum value of the height C of the rib portion 6 is 2.0 μm, and the ratio of the thickness A to the width B is 1:1. Since the smaller the rib portion and the substrate in design, the better the rib portion and the substrate, the minimum values of the thickness A, the width B, and the height C are the limit values for miniaturization in the manufacturing process. Further, from the viewpoint of confining light, it is preferable that the smaller the respective dimensions of the thickness A and the width B are, the more the light is confined, as long as the dimensions are within the range in which the single mode condition of light is maintained.

The modulation electrode includes a signal electrode S and a ground electrode G. The modulation electrode is formed, for example, by depositing Ti/Au on the substrate 5 and then patterning the electrode by a photolithography process. The modulation electrode may be any appropriate metal, and the method of forming the modulation electrode on the substrate 5 is not particularly limited. The thickness of the modulation electrode is, for example, 20 μm or more.

Figure 5:
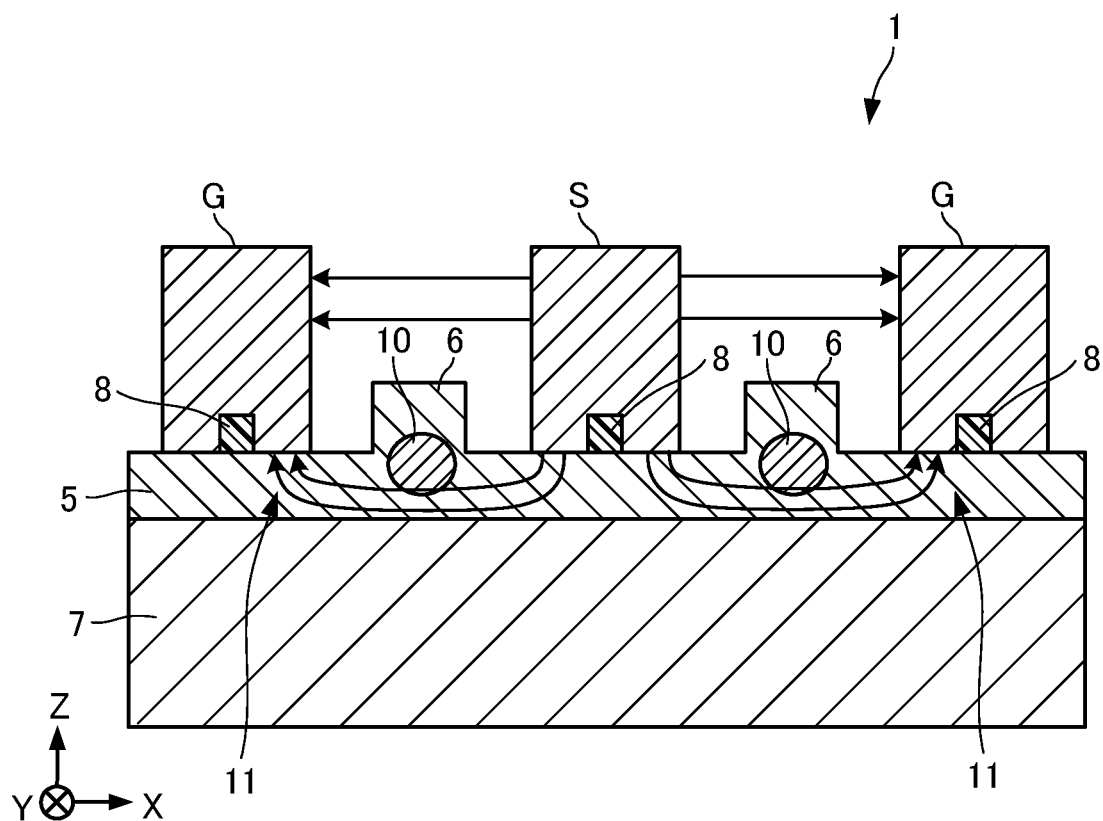
FIG. 5 is a diagram showing a first example of a cross-sectional structure of an optical modulator according to an embodiment of the present invention.

The signal electrode S is, for example, an electrode for applying an electric field 11 to the optical waveguide 10, as shown in FIG. 5, and is arranged so as to extend in parallel with the optical waveguide 10, for example. Although not shown, the signal electrode S is connected to a signal source and a terminating resistor, so that a high-frequency electric signal is supplied from the signal source and terminated by the terminating resistor. The ground electrode G is an electrode connected to a reference potential point, and is arranged so as to extend in parallel with the optical waveguide 10 like the signal electrode S, for example. The signal electrode S and the ground electrode G are provided apart from each other, so that an electric field 11 is formed between the signal electrode S and the ground electrode G. The signal electrode S and the ground electrode G form, for example, a coplanar line.

The reinforcing substrate 7 is a member that supplements the strength of the extremely thin substrate 5 and can stably support the substrate 5 and the modulation electrodes on the substrate 5. The reinforcing substrate 7 is directly bonded to the back side of the substrate 5, or is bonded to the back side of the substrate 5 with an adhesive or the like. When the substrate 5 and the reinforcing substrate 7 are directly joined to each other, for example, a material having a dielectric constant lower than that of the material of the substrate 5 (for example, LN) can be used for the reinforcing substrate 7. On the other hand, when the substrate 5 and the reinforcing substrate 7 are joined to each other with an adhesive, for example, the same material as the substrate 5 (for example, LN) can be used for the reinforcing substrate 7. In this case, an adhesive having a lower dielectric constant and a refractive index than the material of the substrate 5 (for example, LN) is used, and a thickness of an adhesive layer between the substrate 5 and the reinforcing substrate 7 is, for example, 30 μm or more.

As shown in FIG. 2A, the resin 8 is partially arranged between the modulation electrode and the substrate 5. Further, as shown in an arrangement pattern of FIG. 3, the resin 8 is arranged to extend between the modulation electrode and the substrate 5, for example, along the direction in which the optical waveguide 10 extends, which is the propagation direction of the light wave. The resin 8 serves as a cushioning material that relieves stress between the modulation electrode and the substrate 5 due to its viscoelastic property. Compared with a material having high rigidity such as SiO₂ generally used for a buffer layer (Young's modulus of SiO₂: 72 to 74 GPa), the resin 8 is a material having lower rigidity (Young's modulus of resin: about 1 to 2 GPa), so that the resin 8 can serve as a cushioning material that relieves the stress caused by the difference in linear expansion coefficient between the modulation electrode and the substrate 5.

In the example shown in FIG. 2A, the resin 8 is arranged both between the signal electrode S and the substrate 5 and between the ground electrode G and the substrate 5, but the resin 8 may be arranged only either between the signal electrode S and the substrate 5 or between the ground electrode G and the substrate 5.

By partially arranging the resin 8 between the modulation electrode and the substrate 5, the contact surface between the modulation electrode and the resin 8, the contact surface between the modulation electrode and the substrate 5, and the contact surface between the substrate 5 and the resin 8 are formed, so that the contact area between the modulation electrode and the substrate 5 can be reduced by the amount that the resin 8 is arranged. This makes it possible to reduce the stress generated on the substrate 5 by the modulation electrode.

The resin 8 is a resin such as a thermoplastic resin or a thermosetting resin, and includes, for example, a polyamide resin, a melamine resin, a phenol resin, an amino resin, an epoxy resin, and the like.

Further, the resin 8 is, for example, a permanent resist, and is a photoresist made of a thermosetting resin. The resin 8 can be arranged between the modulation electrode and the substrate 5, by coating the resin 8 on the substrate 5 by spin coating, patterning by a normal general photolithography process, and then thermosetting in the manufacturing process of the optical waveguide element. Patterning by a photolithography process can form a fine pattern shape with high accuracy as compared with conventional sputtering film formation, and is suitable for resin formation on the substrate 5 according to the embodiment of the present invention. Further, the buffer layer formed by the conventional sputtering film formation has a thin film thickness, but on the other hand, when the resin 8 is arranged by spin coating, the film thickness can be freely controlled as long as the film thickness is 1μm or more, so that it is preferable for resin formation on the substrate 5 in the embodiment of the present invention. By forming the resin 8 on the substrate 5 and then forming the electrode so that the resin 8 is embedded, it is possible to easily and securely arrange the resin 8 partially between the modulation electrode and the substrate 5.

Figure 4A:
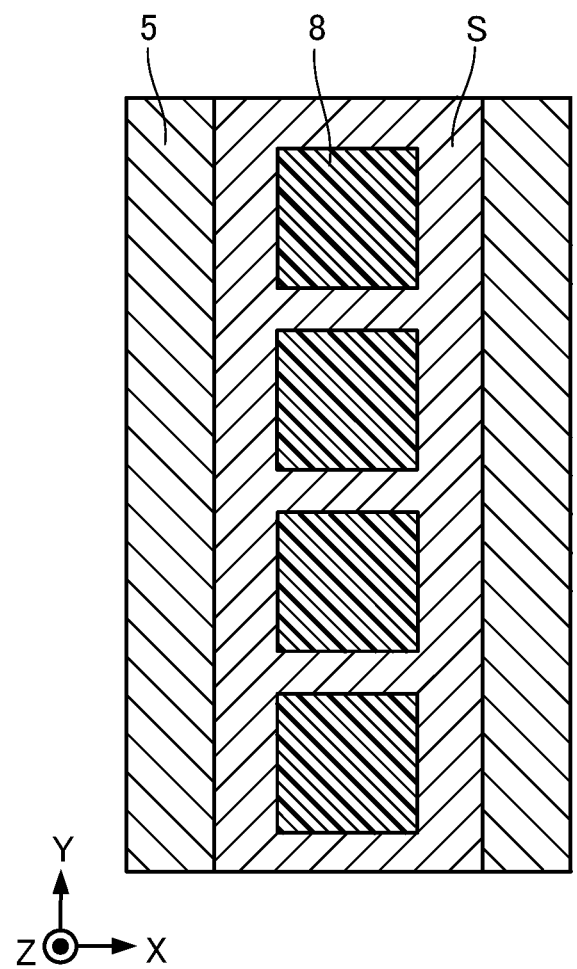
FIG. 4A is a plan view schematically showing an example of an optical modulator according to the embodiment of the present invention, and is a diagram showing a derivative example of a resin arrangement pattern in the region R of FIG. 1.
Figure 4B:
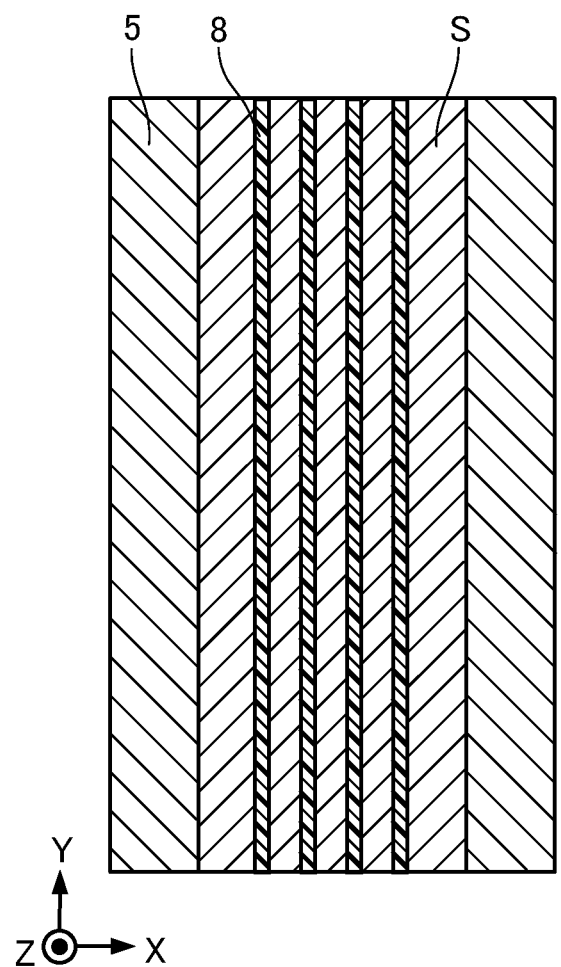
FIG. 4B is a plan view schematically showing an example of an optical modulator according to the embodiment of the present invention, and is a diagram showing a derivative example of a resin arrangement pattern in the region R of FIG. 1.
Figure 4C:
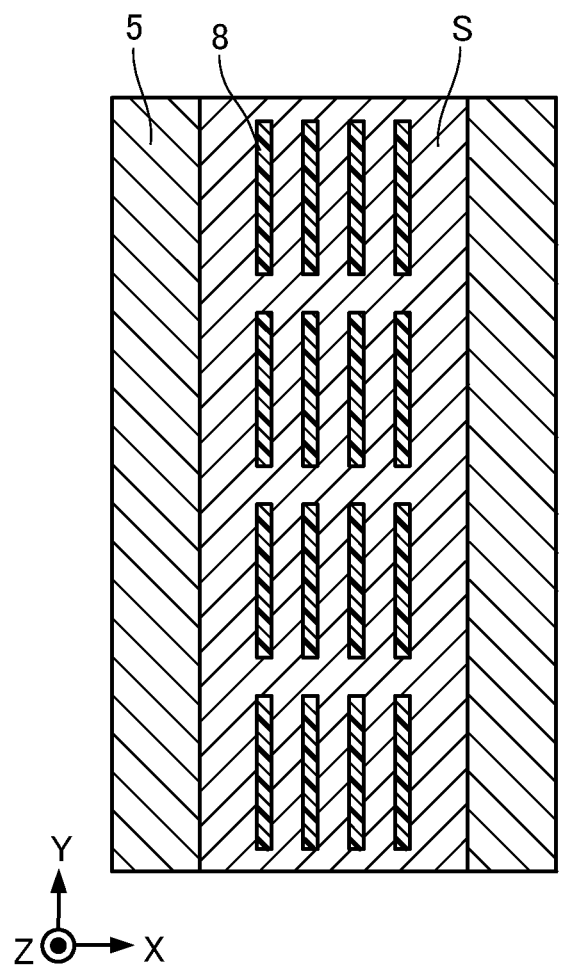
FIG. 4C is a plan view schematically showing an example of an optical modulator according to the embodiment of the present invention, and is a diagram showing a derivative example of a resin arrangement pattern in the region R of FIG. 1.

It should be noted that although FIG. 3 shows an example in which the resin 8 is arranged so as to extend between the modulation electrode and the substrate 5 along the extending direction of the optical waveguide 10, it is also possible to adopt an arrangement pattern, for example, as shown in FIG. 4A to FIG. 4C.

FIG. 4A to FIG. 4C are plan views schematically showing examples of the optical modulator 1 according to the embodiment of the present invention, and are the figures that schematically show derivative examples of the arrangement pattern of the resin 8 in the region R of FIG. 1.

In the arrangement pattern shown in FIG. 4A, a plurality of resin 8 cells (four resin 8 cells in FIG. 4A) constituting the resin 8 are arranged along the extending direction of the optical waveguide 10. In the arrangement pattern shown in FIG. 4B, a plurality of resins 8 are arranged in the width direction in one modulation electrode, and these resins 8 are arranged along the extending direction of the optical waveguide 10. In the arrangement pattern shown in FIG. 4C, a plurality of resins 8 are arranged in the width direction in one modulation electrode, and these resins 8 are intermittently arranged along the extending direction of the optical waveguide 10.

The arrangement pattern of the resin 8 in the width direction and the extending direction of the optical waveguide 10 described in the present embodiment is merely an example, and any arrangement pattern can be adopted as long as the stress generated on the substrate 5 by the modulation electrode is relieved, which is the object of the present invention.

On the other hand, from the results of a peeling test, it has been understood that the relationship among the adhesion strength AS1 between the modulation electrode and the resin 8, the adhesion strength AS2 between the modulation electrode and the substrate 5, and the adhesion strength AS3 between the resin 8 and the substrate 5 is AS1<AS2<AS3. This means that the adhesion strength AS1 between the modulation electrode and the resin 8 is smaller than the adhesion strength AS2 between the modulation electrode and the substrate 5 and the adhesion strength AS3 between the resin 8 and the substrate 5. Therefore, by adopting a pattern that reduces the contact area between the modulation electrode and the resin 8, it is possible to suppress the peeling of the modulation electrode from the substrate 5 due to the weakened adhesion.

As described above, when the contact area between the modulation electrode and the substrate 5 is reduced, the stress generated in the substrate 5 can be reduced, and when the contact area between the modulation electrode and the resin 8 is reduced, the peeling of the modulation electrode can be reduced. However, the reduction in the contact area between the modulation electrode and the substrate 5 and the reduction in the contact area between the modulation electrode and the resin 8 are in a reciprocal relationship. This means that, if the width of the resin 8 is increased, the contact area between the modulation electrode and the substrate 5 can be reduced, while the contact area between the modulation electrode and the resin 8 increases. Further, if the width of the resin 8 is reduced, the contact area between the modulation electrode and the resin 8 can be reduced, while the contact area between the modulation electrode and the substrate 5 increases.

The electric field 11 is emitted vertically from the surface of the signal electrode S toward the ground electrode G from the signal electrode S and is vertically injected on the surface of the ground electrode G. Further, when the dielectric constants are compared, for example, the dielectric constants of LN used as the material of the substrate 5 ($\Sigma\varepsilon_{11}$=43, $\varepsilon_{33}$=28) are higher than the dielectric constants of the resin 8 ($\varepsilon$=3 to 4). Since the electric field 11 is concentrated on the material having a high dielectric constant, when the resin 8 is arranged, the electric field from the signal electrode S to the ground electrode G is concentrated on the substrate 5, and the contact surface between the modulation electrode and the substrate 5 serves as an entrance/exit surface of the electric field 11 applied to the optical waveguide 10. When the width of the resin 8 is too large with respect to the width of the modulation electrode, the electric field 11 may not be properly applied to the optical waveguide 10. Further, it is preferable that the contact surface between the signal electrode S from which the electric field 11 is emitted and the substrate 5 is set to be larger than the contact surface between the ground electrode G into which the electric field 11 is injected and the substrate 5. In the present specification, since the direction of the electric field 11 is a direction from the signal electrode S to the ground electrode G, the contact surface between the signal electrode S and the substrate 5 is expressed as an entrance surface of the electric field 11, and the contact surface between the ground electrode G and the substrate 5 is expressed as an exit surface of the electric field 11.

Figure 8:
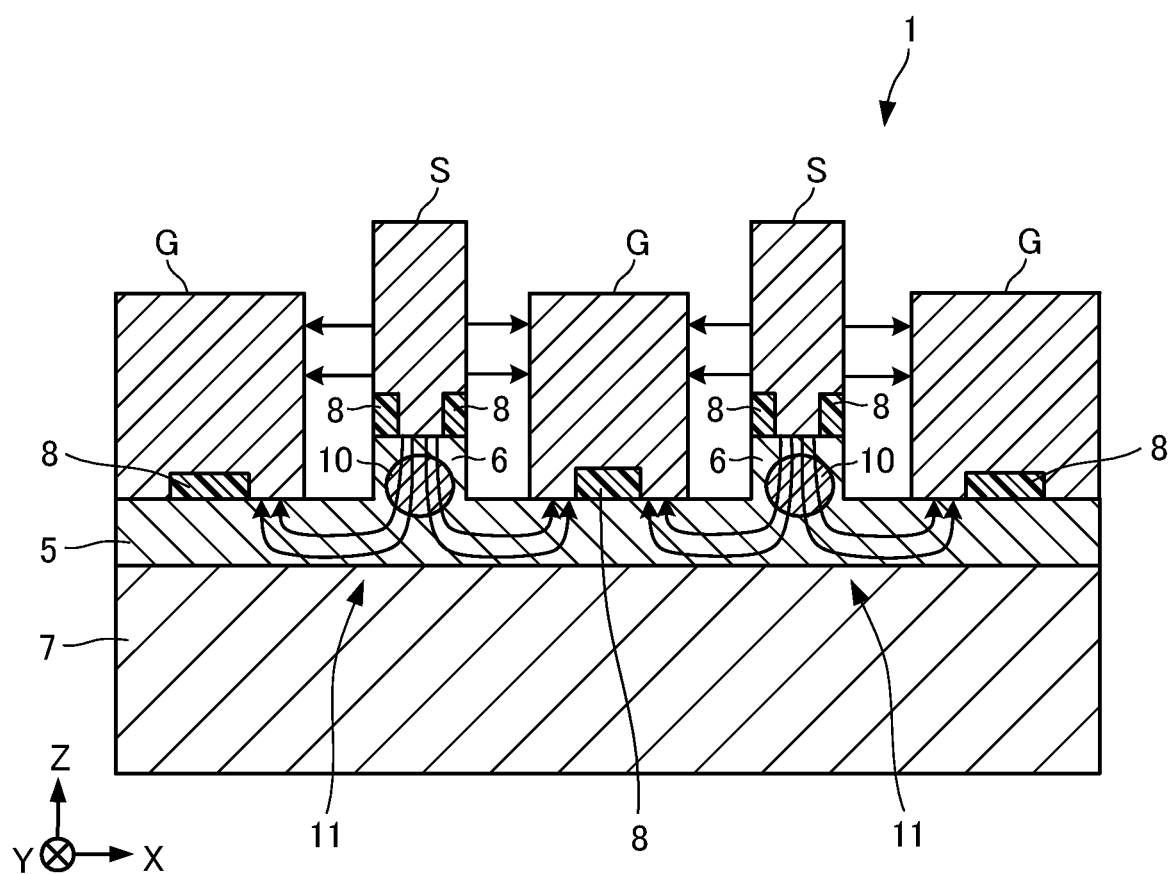
FIG. 8 is a diagram showing a fourth example of a cross-sectional structure of an optical modulator according to an embodiment of the present invention.

From the above viewpoint, in the embodiment of the present invention, the width of the resin 8 arranged between the signal electrode S and the substrate 5 is set to ⅓ or less with respect to the width of the signal electrode S. Further, the width of the resin 8 arranged between the ground electrode G and the substrate 5 is set to ½ or less with respect to the width of the ground electrode G. By setting the ratio of the width of the resin 8 to the width of the modulation electrode as described above, it is possible to effectively apply the electric field to the optical waveguide 10, and to realize a configuration in which the modulation electrode is prevented from peeling off from the substrate 5. When a plurality of resins 8 are arranged in the width direction with respect to one modulation electrode (for example, see FIG. 8 showing a case where a plurality of resins 8 are arranged on one signal electrode S), the total width of the plurality of the resins 8 is regarded as the width of the resin 8.

In the present specification, "the resin 8 is partially arranged between the modulation electrode and the substrate 5" means that the resin 8 is arranged between a part of the bottom surface of the modulation electrode and the substrate 5 that faces a part of the bottom surface of the modulation electrode. To be more specific, the width of the resin 8 is set smaller than the width of the modulation electrode, for example, in accordance with the above ratio, so that, by arrangement of the resin 8, three contact surfaces are formed, which are: a contact surface between the modulation electrode and the resin 8; a contact surface between the modulation electrode and the substrate 5; and a contact surface between the substrate 5 and the resin 8.

The arrangement position of the resin 8 arranged between the modulation electrode and the substrate 5 is not particularly limited. Hereinafter, the arrangement position of the resin 8 and the state of the electric field 11 formed between the signal electrode S and the ground electrode G at said arrangement position of the resin 8 will be described, referencing a few examples.

FIG. 5 is a diagram showing a first example of the cross-sectional structure of the optical modulator 1 according to the embodiment of the present invention. The cross-sectional structure of FIG. 5 is the same as the cross-sectional structure shown in the cross-sectional view taken along the line P-P of FIG. 1, but FIG. 5 further shows the state of the electric field 11 formed between the signal electrode S and the ground electrode G, and the optical waveguide 10.

In FIG. 5, the signal electrode S and the ground electrode G are provided on an X-cut substrate 5 on which an optical waveguide 10 is arranged between modulation electrodes in the action portion of the LN modulator, and a cross-sectional structure of the optical modulator 1 that uses a rib portion 6 of the substrate 5 as the optical waveguide 10 is shown. The electric field 11 formed between the signal electrode S and the ground electrode G is applied to the optical waveguide 10 formed in the rib portion 6 and adjusts the electric field strength by controlling the electric signal supplied from the signal source, so that the light wave propagating in the optical waveguide 10 is appropriately modulated.

When the electric field 11 is formed between the signal electrode S and the ground electrode G, the entrance/exit surface of the electric field 11 is narrowed to the contact surface between the modulation electrode and the substrate 5 due to the presence of the resin 8. For example, as shown in FIG. 5, the optical modulator 1 has such a structure that the resin 8 is arranged at the center of the signal electrode S and the ground electrode G in the width direction, the signal electrode S and the substrate 5 come into contact with each other at the end in the width direction of the signal electrode S, and the ground electrode G and the substrate 5 come into contact with each other at the end in the width direction of the ground electrode G. By this structure, the entrance/exit surface of the electric field 11 is narrowed by the resin 8, and the entrance/exit surface of the electric field 11 can be unevenly arranged on the proximal side of the optical waveguide 10. As a result, the electric field 11 can be efficiently concentrated on the optical waveguide 10, so that the modulation efficiency of the light wave in the optical waveguide 10 can be improved.

Figure 6:
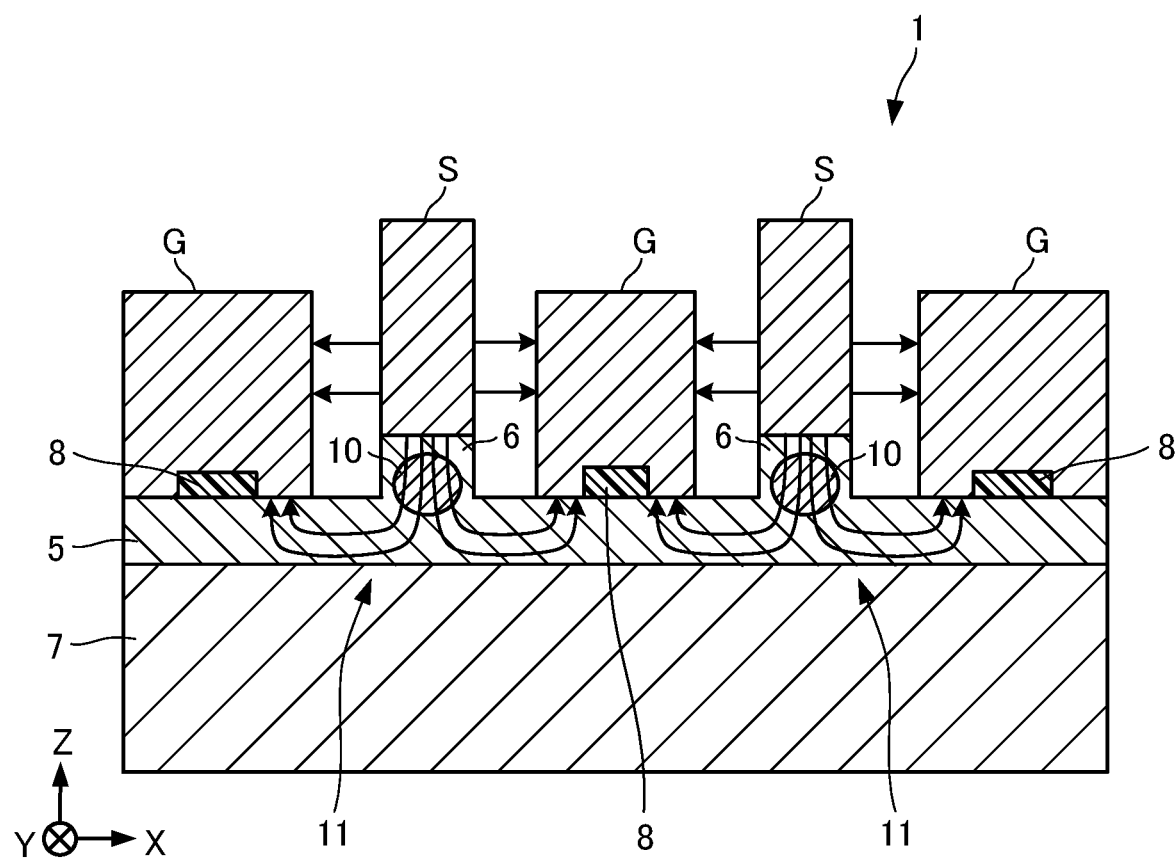
FIG. 6 is a diagram showing a second example of the cross-sectional structure of the optical modulator according to the embodiment of the present invention.

FIG. 6 is a diagram showing a second example of the cross-sectional structure of the optical modulator 1 according to the embodiment of the present invention. FIG. 6 shows the state of the electric field 11 formed between the signal electrode S and the ground electrode G, and the optical waveguide 10, together with the cross-sectional structure of the optical modulator 1.

FIG. 6 shows a cross-sectional structure of the optical modulator 1 which has the signal electrode S and the ground electrode G provided on the Z-cut substrate 5, that the optical waveguide 10 is arranged under the modulation electrode in the LN modulator, and uses the rib portion 6 of the substrate 5 as the optical waveguide 10. As shown in FIG. 6, when the substrate 5 is Z-cut, the signal electrode S is provided on the rib portion 6, but in order to suppress the absorption of light by the signal electrode S, a layer that does not absorb light such as a buffer layer or a transparent electrode layer, may be arranged between the optical waveguide 10 and the signal electrode S.

As an example, FIG. 6 shows a case where the resin 8 is not arranged between the signal electrode S and the rib portion 6 of the substrate 5, instead the resin 8 is arranged only between the ground electrode G and the substrate 5. The resin 8 is arranged at the center of the ground electrode G in the width direction. In this case, due to the presence of the resin 8, the ground electrode G and the substrate 5 come into contact with each other at the end in the width direction of the ground electrode G. By this structure, the exit surface of the electric field 11 is narrowed by the resin 8, and the exit surface of the electric field 11 can be unevenly arranged on the proximal side of the optical waveguide 10. As a result, the electric field 11 can be efficiently concentrated on the optical waveguide 10, so that the modulation efficiency of the light wave in the optical waveguide 10 can be improved.

Figure 7:
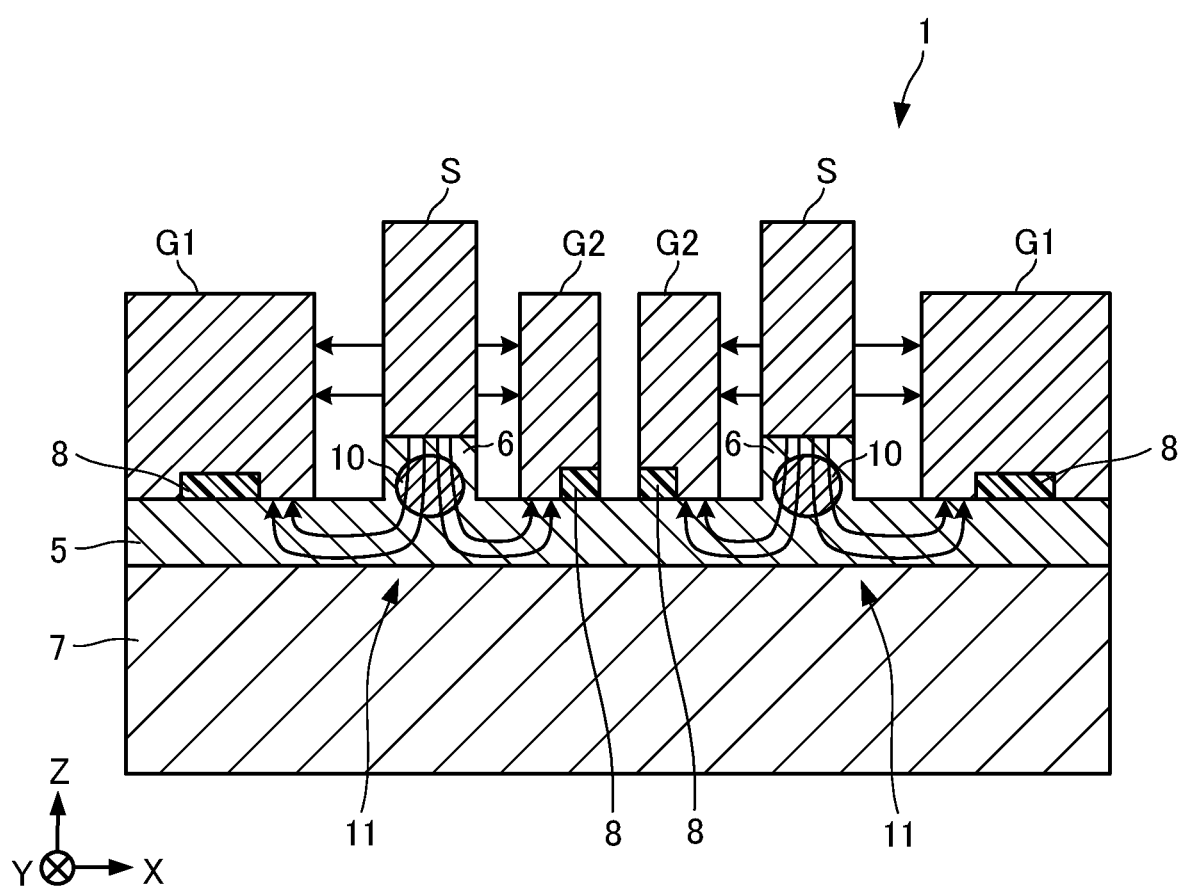
FIG. 7 is a diagram showing a third example of a cross-sectional structure of an optical modulator according to an embodiment of the present invention.

FIG. 7 is a diagram showing a third example of the cross-sectional structure of the optical modulator 1 according to the embodiment of the present invention. FIG. 7 shows the state of the electric field 11 formed between the signal electrode S and the ground electrodes G1, G2, and the optical waveguide 10, together with the cross-sectional structure of the optical modulator 1.

FIG. 7 shows a cross-sectional structure of the optical modulator 1 which has the signal electrode S and the ground electrodes G1, G2 provided on the Z-cut substrate 5, that the optical waveguide 10 is arranged under the modulation electrode in the LN modulator, and uses the rib portion 6 of the substrate 5 as the optical waveguide 10. As shown in FIG. 7, when the substrate 5 is Z-cut, the signal electrode S is provided on the rib portion 6, but in order to suppress the absorption of light by the signal electrode S, a layer that does not absorb light such as a buffer layer or a transparent electrode layer, may be arranged between the optical waveguide 10 and the signal electrode S.

Comparing the cross-sectional structure of FIG. 6 with the cross-sectional structure of FIG. 7, the cross-sectional structure of FIG. 6 has a configuration in which one ground electrode G is arranged in the vicinity of the center, while the cross-sectional structure of FIG. 7 has a configuration in which the ground electrode G2 divided into two is arranged in the vicinity of the center. In some cases, the dimension in the width direction of the ground electrode G in the vicinity of the center of FIG. 6 may be increased depending on the dimension in the width direction of the two optical waveguides 10. On the other hand, in the cross-sectional structure of FIG. 7, the ground electrode G in the vicinity of the center of FIG. 6 is divided into two ground electrodes G2 by inserting a slit. Since the contact area between the two ground electrodes G2 and the substrate 5 in FIG. 7 is smaller than the contact area between the ground electrode G and the substrate 5 in FIG. 6, the configuration shown in FIG. 7 is a configuration in which the stress generated on the substrate 5 by the modulation electrode is relieved, compared with the configuration shown in FIG. 6.

As an example, FIG. 7 shows a case where the resin 8 is not arranged between the signal electrode S and the rib portion 6 of the substrate 5, instead the resin 8 is arranged only between the ground electrodes G1, G2 and the substrate 5. The resin 8 is arranged in the center of the ground electrode G1 in the width direction. On the other hand, the ground electrode G2 is provided with the resin 8 at the end in the width direction on the distal side of the optical waveguide 10. By this structure, the exit surface of the electric field 11 is narrowed by the resin 8, and the exit surface of the electric field 11 can be unevenly arranged on the proximal side of the optical waveguide 10. As a result, the electric field 11 can be efficiently concentrated on the optical waveguide 10, so that the modulation efficiency of the light wave in the optical waveguide 10 can be improved.

FIG. 8 is a diagram showing a fourth example of the cross-sectional structure of the optical modulator 1 according to the embodiment of the present invention. FIG. 8 shows the state of the electric field 11 formed between the signal electrode S and the ground electrode G, and the optical waveguide 10, together with the cross-sectional structure of the optical modulator 1.

FIG. 8 shows a cross-sectional structure of the optical modulator 1 which has the signal electrode S and the ground electrode G provided on the Z-cut substrate 5, that the optical waveguide 10 is arranged under the modulation electrode in the LN modulator, and uses the rib portion 6 of the substrate 5 as the optical waveguide 10. As shown in FIG. 8, when the substrate 5 is Z-cut, the signal electrode S is provided on the rib portion 6, but in order to suppress the absorption of light by the signal electrode S, a layer that does not absorb light such as a buffer layer or a transparent electrode layer, may be arranged between the optical waveguide 10 and the signal electrode S.

FIG. 8 shows, as an example, a case where the resin 8 is arranged between the signal electrode S and the rib portion 6 of the substrate 5 and between the ground electrode G and the substrate 5. The resin 8 is arranged at the end of the signal electrode S in the width direction. The resin 8 is arranged at the center in the width direction of the ground electrode G. For example, as shown in FIG. 8, the optical modulator 1 has a structure in which the signal electrode S and the substrate 5 are in contact with each other at the center in the width direction of the signal electrode S, and the ground electrode G and the substrate 5 are in contact with each other at the end in the width direction of the ground electrode G. By this structure, the entrance/exit surface of the electric field 11 is narrowed by the resin 8, so that the electric field 11 is concentrated on the optical waveguide 10 below the signal electrode S and the exit surface of the electric field 11 is biased toward the proximal side of the optical waveguide 10. As a result, the electric field 11 can be efficiently concentrated on the optical waveguide 10, so that the modulation efficiency of the light wave in the optical waveguide 10 can be improved.

Figure 9:
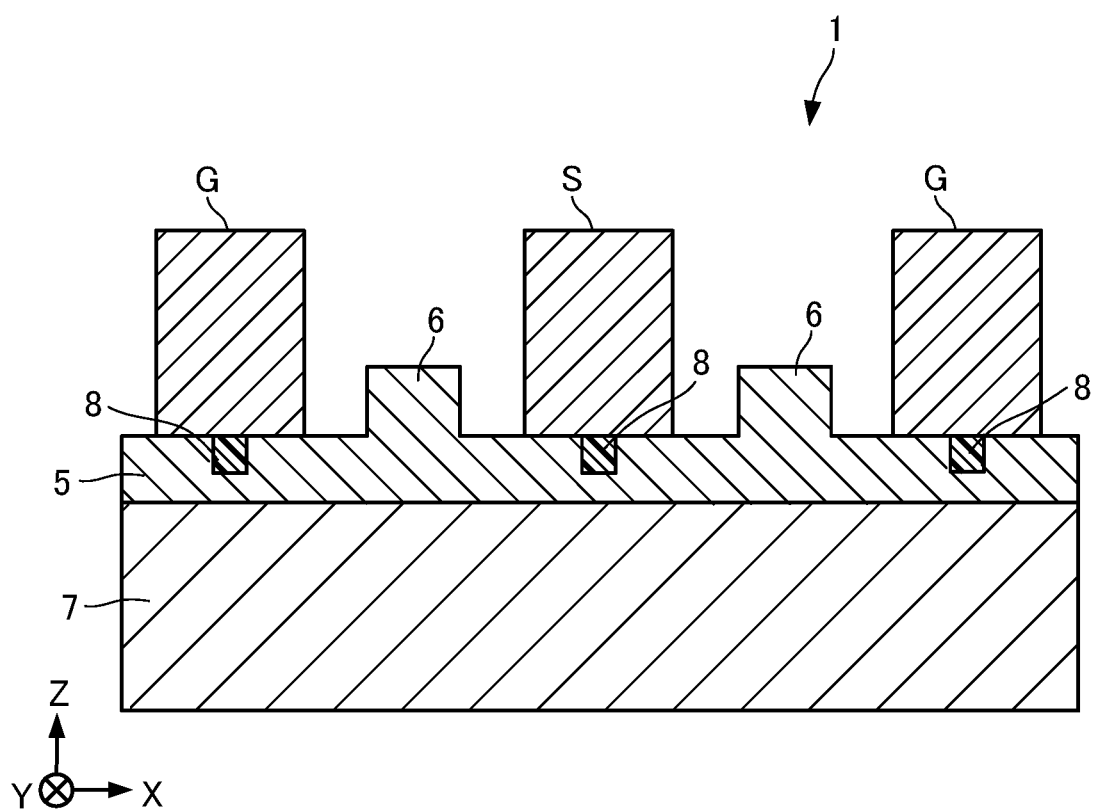
FIG. 9 is a diagram showing a fifth example of a cross-sectional structure of an optical modulator according to an embodiment of the present invention.

FIG. 9 is a diagram showing a fifth example of the cross-sectional structure of the optical modulator 1 according to the embodiment of the present invention. The cross-sectional structure of FIG. 9 is similar to the cross-sectional structure of FIG. 5, but is different in the point that the resin 8 is arranged in the substrate 5 in the cross-sectional structure of FIG. 9, while the resin 8 is arranged in the modulation electrode in the cross-sectional structure of FIG. 5.

As shown in FIG. 9, even in a case where the resin 8 is arranged in the substrate 5, the same action and effect as the cross-sectional structure of FIG. 5 in which the resin 8 is arranged in the modulation electrode is obtained. Even in the cross-sectional structure of FIG. 9, the entrance/exit surface of the electric field 11 can be biased toward the proximal side of the optical waveguide 10 by arranging the resin 8. As a result, the electric field 11 can be efficiently concentrated on the optical waveguide 10, thereby making it possible to improve the modulation efficiency of the light wave in the optical waveguide 10.

Figure 10:
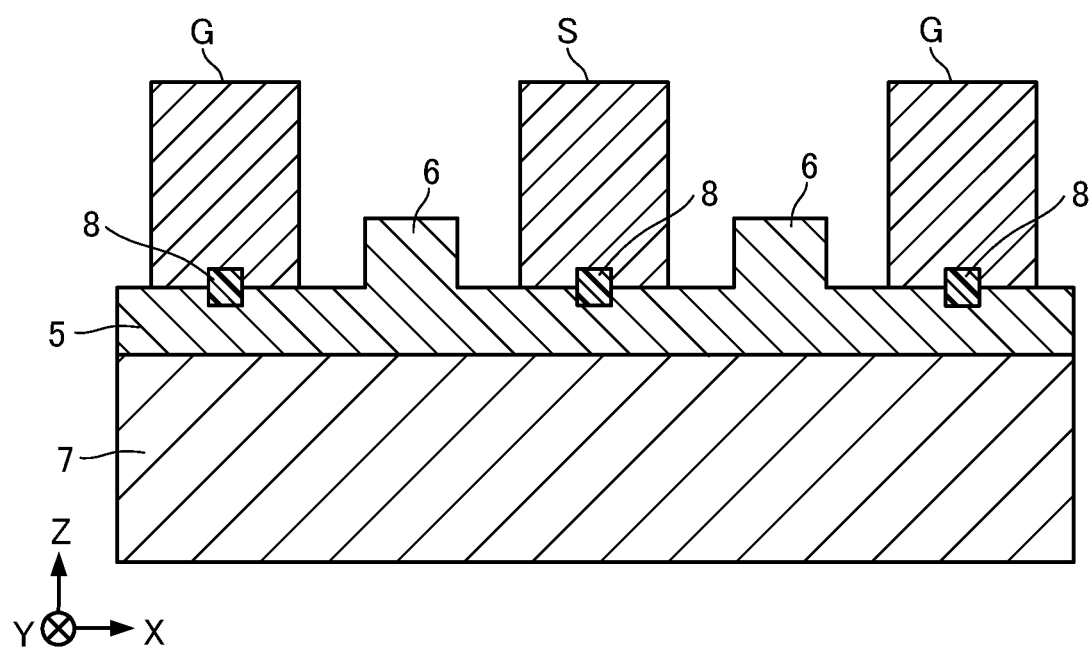
FIG. 10 is a diagram showing a sixth example of a cross-sectional structure of an optical modulator according to an embodiment of the present invention.

FIG. 10 is a diagram showing a sixth example of the cross-sectional structure of the optical modulator 1 according to the embodiment of the present invention. The cross-sectional structure of FIG. 10 is similar to the cross-sectional structure of FIG. 5, but is different in the point that the resin 8 is arranged across both of the modulation electrode and the substrate 5 in the cross-sectional structure of FIG. 10, while the resin 8 is arranged in the modulation electrode in the cross-sectional structure of FIG. 5.

As shown in FIG. 10, even in a case where the resin 8 is arranged across both of the modulation electrode and the substrate 5, the same action and effect as the cross-sectional structure of FIG. 5 in which the resin 8 is arranged in the modulation electrode is obtained. Even in the cross-sectional structure of FIG. 10, the entrance/exit surface of the electric field 11 can be biased toward the proximal side of the optical waveguide 10 by arranging the resin 8. As a result, the electric field 11 can be efficiently concentrated on the optical waveguide 10, thereby making it possible to improve the modulation efficiency of the light wave in the optical waveguide 10.

Here, a case where the resin 8 is arranged in the substrate 5 or across both of the modulation electrode and the substrate 5 will be described, while comparing the cross-sectional structure of FIG. 5 with the cross-sectional structures of FIG. 9 and FIG. 10. However, the resin 8 may be arranged in the substrate 5 or across both of the modulation electrode and the substrate 5, for example, in the cross-sectional structure of FIG. 6 to FIG. 8 or any other cross-sectional structure.

Further, in the cross-sectional structures of FIG. 5 to FIG. 10, the resin 8 is arranged so that the contact surface between the signal electrode S or the ground electrode G and the substrate 5 is symmetrical with respect to the optical waveguide 10. By arranging the resin 8 in this way, it is possible to efficiently apply an electric field to the optical waveguide 10. Further, in the cross-sectional structures of FIG. 5 to FIG. 10, the resin 8 is arranged, for example, so that the electric fields applied to the pair of parallel waveguides in a Mach-Zehnder-type waveguide and the like are symmetrical. By arranging the resin 8 in this way, it becomes possible to apply the electric field 11 that is symmetrical to the pair of parallel waveguides. As a result, it is possible to suppress the non-uniformity of the modulation efficiency that may occur due to the asymmetry of the electric field 11 and the occurrence of chirping due to the asymmetry of the modulation efficiency.

Further, the cross-sectional structures of FIG. 5 to FIG. 10 can be applied to the arrangement patterns of FIG. 3 and FIG. 4A to FIG. 4C or any arrangement pattern. The cross-sectional structures of FIG. 5 to FIG. 10 have the effect of relieving the stress generated on the substrate 5 by the modulation electrode and the effect of efficiently concentrating the electric field 11 on the optical waveguide 10 to improve the modulation efficiency of the light wave in the optical waveguide 10. This means that, in the present invention, it is possible to reduce the stress generated on the substrate 5 by the modulation electrode by partially arranging the resin 8 between the modulation electrode and the substrate 5, and in addition to this, it is possible to efficiently concentrate the electric field 11 on the optical waveguide 10 and improve the modulation efficiency of the light wave in the optical waveguide 10 by appropriately designing the arrangement position of the resin 8 having a stress relieving effect.

Further, in the present embodiment, the rib-type substrate in which the rib portion 6 is formed on the substrate 5 is described as an example. However, as described above, the present invention is not limited to the rib-type substrate, and is also applicable to, for example, a normal substrate (see FIG. 2B) in which an optical waveguide 10 is formed in the substrate 5 by thermal diffusion of metal. Similarly, on a normal substrate as shown in FIG. 2B, the resin 8 can be arranged in the arrangement patterns of FIG. 3 and FIG. 4A to FIG. 4C or any arrangement pattern. Further, in the ordinary substrate as shown in FIG. 2B, the resin 8 can be similarly arranged at the positions shown in FIG. 9 and FIG. 10.

Further, in the present embodiment, a coplanar line structure in which one ground electrode G is arranged on each side of one signal electrode S is described as an example. However, the present invention is not limited to such a coplanar line structure, and for example, a coplanar line structure having a differential line in which one ground electrode G is arranged on each side of two parallel signal electrodes S may be adopted.

The present invention is not limited to the above-described embodiments and modifications, but includes various modifications and design changes within the technical scope thereof without departing from the technical idea of the present invention.

INDUSTRIAL APPLICABILITY

The present invention provides an optical modulator capable of preventing damage to the substrate and preventing deterioration of the properties of the modulator by reducing the stress on the substrate generated by the modulation electrode, and can be applied to an optical communication field, an optical measurement field, and the like.

EXPLANATION OF REFERENCE NUMERALS

1 Optical Modulator
2a-2c Branch Portion
3a-3c Multiplexing Portion
5 Substrate
6 Rib Portion
7 Reinforcing Substrate
8 Resin
10 Optical Waveguide
11 Electric Field
G, G1, G2 Ground Electrode
S Signal Electrode

The invention claimed is:

1. An optical modulator, comprising:
a substrate having an electro-optic effect;
an optical waveguide formed on the substrate; and
a modulation electrode provided on the substrate and modulating a light wave propagating in the optical waveguide, wherein
a resin is arranged between a part of a bottom surface of the modulation electrode and the substrate facing the part of the bottom surface of the modulation electrode,
the modulation electrode includes a signal electrode and a ground electrode arranged along a part of the optical waveguide, and the resin is arranged between a part of a bottom surface of at least one of the signal electrode and the ground electrode, and the substrate facing at least one of the signal electrode and the ground electrode, and
when the resin is arranged between the signal electrode and the substrate, the width of the resin is set to ⅓ or less of the width of the signal electrode, and when the resin is arranged between the ground electrode and the substrate, the width of the resin is set to ½ or less of the width of the ground electrode.

2. The optical modulator according to claim 1, wherein the resin is arranged in the modulation electrode.

3. The optical modulator according to claim 1, wherein the resin is arranged so that a contact surface between the modulation electrode and the substrate is symmetric with respect to the optical waveguide.

4. The optical modulator according to claim 1, wherein the resin is arranged so that a contact surface between the bottom surface of the modulation electrode and the substrate is arranged on a proximal side of the optical waveguide.

5. The optical modulator according to claim 1, wherein thickness of the resin is 1.0 μm or more.

6. The optical modulator according to claim 1, wherein the resin is either a thermoplastic resin or a thermosetting resin.

7. The optical modulator according to claim 1, wherein thickness of the substrate is 4.0 μm or less.

8. The optical modulator according to claim 1, wherein a rib portion projecting from the substrate is used as the optical waveguide.

9. The optical modulator according to claim 1, wherein the modulation electrode is made of metal and the substrate is made of lithium niobate.

10. The optical modulator according to claim 1, wherein the optical waveguide is constituted by a plurality of Mach-Zehnder portions.

11. The optical modulator according to claim 1, wherein three contact surfaces are formed by arrangement of the resin, which are: a contact surface between the resin and the at least one of the signal electrode and the ground electrode; a contact surface between the substrate and the at least one of the signal electrode and the ground electrode; and a contact surface between the substrate and the resin.

12. An optical modulator, comprising:
a substrate having an electro-optic effect;
an optical waveguide formed on the substrate; and
a modulation electrode provided on the substrate and modulating a light wave propagating in the optical waveguide, wherein
a resin is arranged between a part of a bottom surface of the modulation electrode and the substrate facing the part of the bottom surface of the modulation electrode, and
the resin is arranged within the width of the modulation electrode so that a contact surface in which the bottom surface of the modulation electrode is in direct contact with the substrate is arranged on a proximal side of the optical waveguide, when viewed in cross-section perpendicular to the optical waveguide.

13. The optical modulator according to claim 12, wherein three contact surfaces are formed by arrangement of the resin, which are: a contact surface in which the resin is in direct contact with the at least one of the signal electrode and the ground electrode; a contact surface in which the substrate is in direct contact with the at least one of the signal electrode and the ground electrode; and a contact surface in which the substrate is in direct contact with the resin.

* * * * *